G. A. SCHMIDT.
PLEASURE RAILWAY.
APPLICATION FILED OCT. 14, 1920.
1,395,657.
Patented Nov. 1, 1921.
2 SHEETS—SHEET 2.
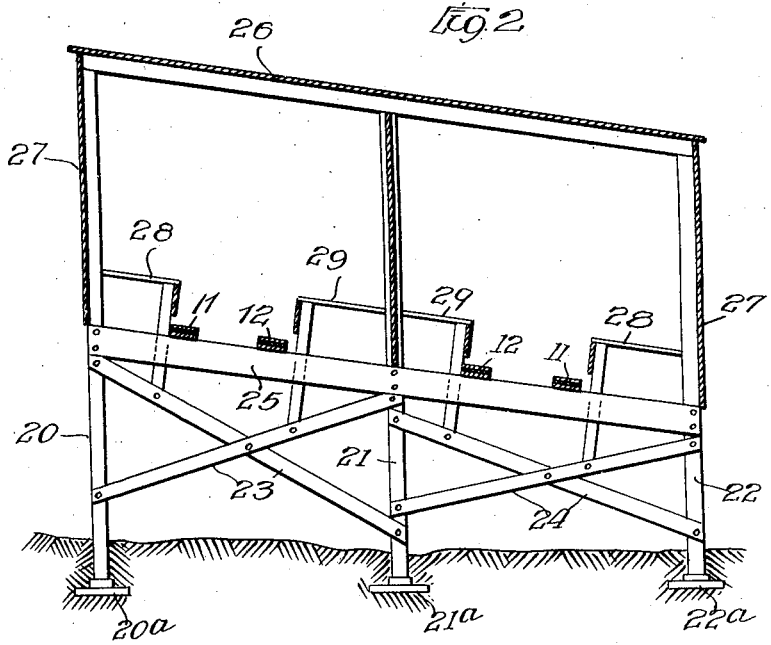
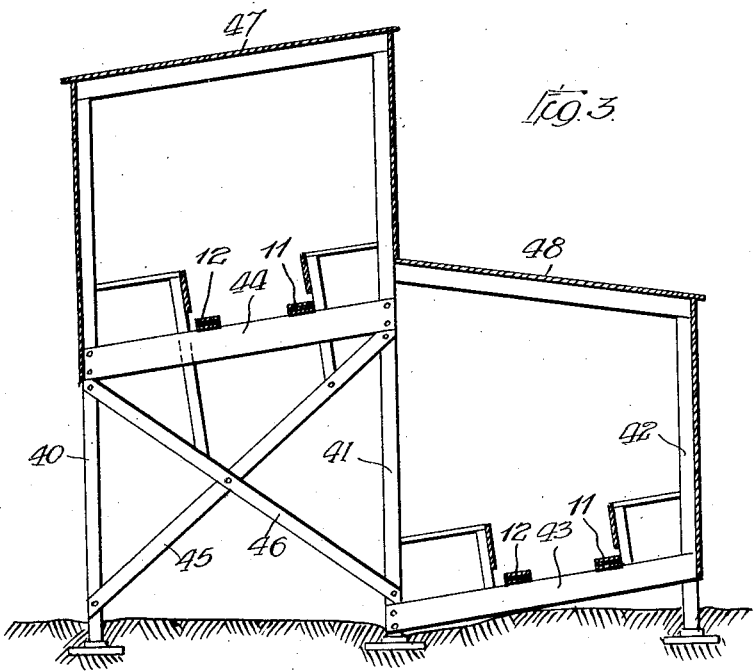

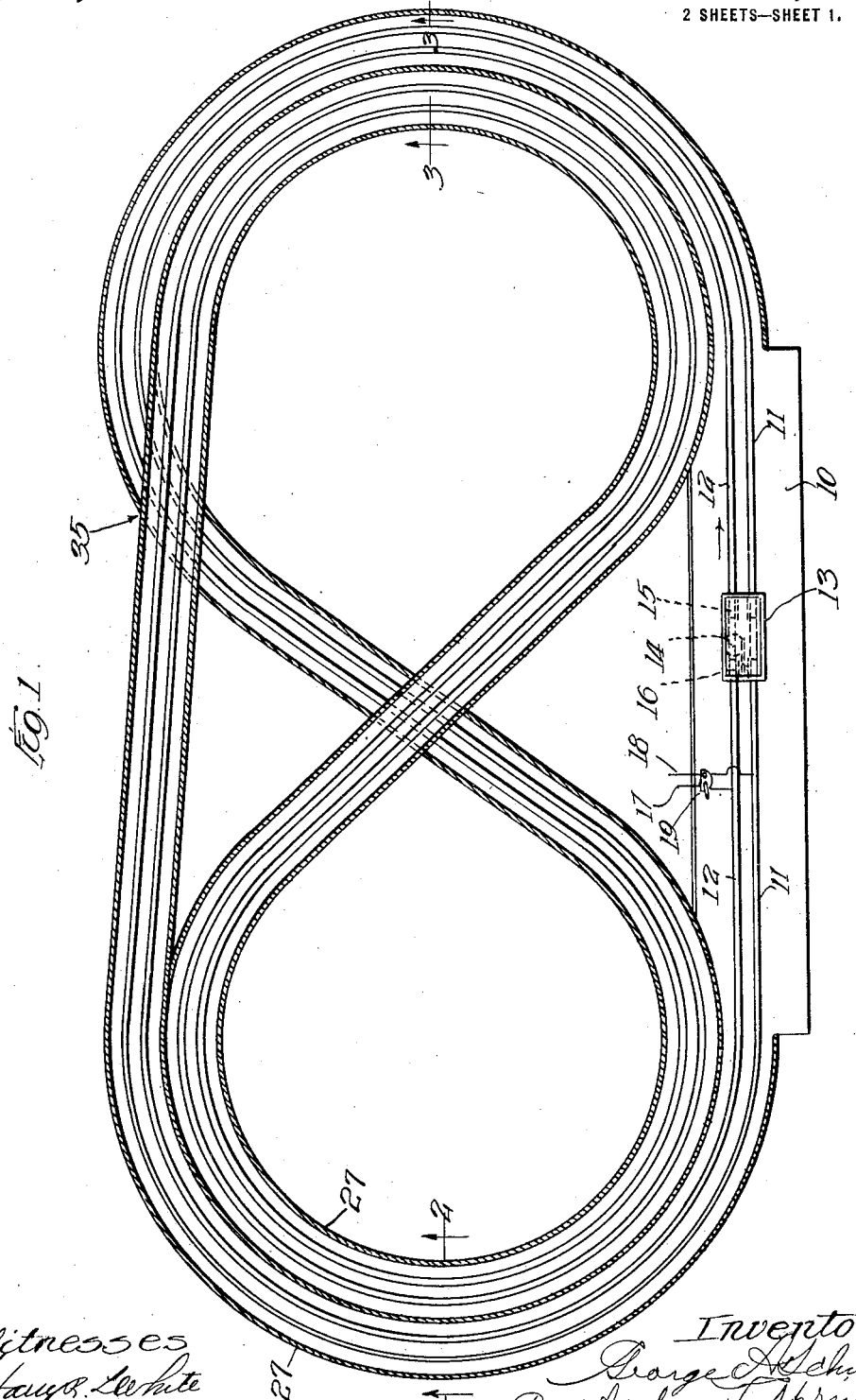

UNITED STATES PATENT OFFICE.

GEORGE A. SCHMIDT, OF CHICAGO, ILLINOIS.

PLEASURE-RAILWAY.

1,395,657.  Specification of Letters Patent.  Patented Nov. 1, 1921.

Application filed October 14, 1920. Serial No. 416,833.

*To all whom it may concern:*

Be it known that I, GEORGE A. SCHMIDT, a citizen of the United States, residing at Chicago, in the county of Cook and State of Illinois, have invented certain new and useful Improvements in Pleasure-Railways, of which the following is a specification.

The invention relates to pleasure railways of the type commonly found in pleasure resorts, amusement parks and the like, such railways commonly being referred to as of the figure 8 type, and the invention has for its primary object to provide a pleasure railway in which the passengers carrying cars thereof are conducted through certain closed tortuous passages, and are then suddenly flashed into the light across an open space in full view of an asembled crowd of spectators.

It is a further object of the invention to provide means for controlling a car which is to be operated throughout the system in which a part of the track is inclosed and another part open to the view of a crowd assembled near the loading and unloading platform.

Other objects of the invention will appear from the following description of the invention which relates to the preferred embodiment thereof shown in the drawings, the novel features being set forth with particularity in the appended claims.

In the said drawings, Figure 1 is a plan view showing the track inclosing parts of the structure in section in order to disclose the configuration of the track and the relative position thereto of the loading and unloading platform.

Fig. 2 is a sectional view through the track and the covering structure therefor on line 2—2 of Fig. 1; and Fig. 3 is a similar sectional view taken on line 3—3 of Fig. 1.

The loading and unloading platform is indicated generally by reference character 10 and the track which consists of two parallel rails designated generally by reference characters 11 and 12 is preferably in the general form of the figure 8 construction, although any other form of configuration of track may be employed under certain conditions to obtain any of the desirable features of the ride when coupled with the improvements herein specified. The rails 11 and 12 of the track will be spaced apart the usual convenient distance to furnish a support or runway for the passenger carrying car. The latter may be of any suitable construction having trucks provided with flanged carrying wheels adapted to coöperate with the rails 11 and 12 of the track. In the present embodiment of the invention the details of such a car are not shown, but the outline body is indicated by reference character 13 in Fig. 1, and it is preferred that the car 13 be electrically driven, the outline of a motor being indicated in Fig. 1 and designated by reference character 14. The car 13 may be supported upon suitable wheeled trucks or bogies operated by the motor 14 and indicated only generally by dotted lines as at 15 and 16, Fig. 1.

It will be seen that at the extremities of the platform 10 the rails 11 and 12 of the track pass immediately into covered track portions or canyons and the general course of the car as it follows the track in its course through the structure in the direction indicated by the arrow on the platform 10 of Fig. 1 will be first in the general form of the figure 8 after which it will be seen that the track rails form a loop encircling the sinus at the left, as shown in Fig. 1, and returns thence to the opposite end of the loading and unloading platform 10, whence the car leaves at the beginning of its journey. The car body 13 is shown in Fig. 1 at a position on the platform 10 where the loading or unloading operation may conveniently take place and the rails 11 and 12 are shown in Fig. 1 supplied with electric current for operating the motor 14 of the car from any suitable source of current supply, the lead lines from the source of current supply being designated by the reference characters 17 and 18 respectively. The current in the lines 17 and 18 is under the control of suitable switch mechanisms, as indicated at 19, which will be under the control of an operator who may at all times be stationed upon the platform 10 in proximity to the switch 19 so that in case it is desired to stop the car body within the canyon-like or covered portions of the track this may be done by the operator from the platform at any time, and it is one of the important features of the invention that by the arrangement described the car body 13 containing the passengers will be at all times completely under the control of the operator on the platform adjacent the switch 19 in the current supply line. The operator may therefore, at any time start the car by closing the circuit and as the current is supplied to the two separated parallel rails 11 and 12, which will be suitably insulated from the structure and from the earth and from each other, the circuit will be completed by passing through the respective wheels on the opposite rails of the track and thence through the armature or field of the motor 14 to actuate the motor and hence to rotate the driving wheels of the car. The interposition of the loading and unloading platform 10 together with the electrical arrangement for operating the car, as described, will not only enable the operator to cause the loaded car 13 to be stopped at any point in the darkened and canyon-like parts of the track structure between the extremities of the loading and unloading platform, but the same arrangement will also enable the operator to operate the loaded car in the direction indicated by the arrow in Fig. 1 all the way over the figure 8 section of the track and around the encircling loop so that the car may be flashed or caused to pass at full speed out of the covered portion of the track at the left hand end of the loading and unloading platform 10, and in thus passing out of the darkened canyon-like covered track the passengers in the car will be suddenly brought to the light in full view of the assembled spectators in front of the platform, with the result that much mirth and consternation will be provoked when the passengers find themselves suddenly in view of the assembled crowd, thus adding to the importance of the ride as a pleasure and mirth provoking device, as it will be seen that persons particularly who have never ridden on a similar device will not anticipate that the car will be flashed across the platform in view of the assembled crowd until the ride is nearing its completion and the car has begun to slow down when according to the preferred manner of operating the ride the car will be operated at full speed, particularly at the time it first approaches the loading and unloading platform, so that on its first appearance across said platform it will pass thereover at approximately its ordinary normal speed even in the covered portions of the track.

The structure for supporting the track may be built according to any approved design, that preferred by me, being illustrated herewith and shown in detail by the sectional views of Figs. 2 and 3. It will be seen, that as indicated in Fig. 2, the structure consists primarily of the vertical posts 20, 21 and 22, which are spaced apart, 20 and 22 being the outside posts and 21 being the intermediate post of each strut of the structure, the said posts being preferably partially sustained by suitable base mountings, as indicated at 20ª, 21ª and 22ª, the latter being countersunk in the earth a short distance, if desired, for the purpose of giving increased stability to the structure. The posts 20, 21 and 22 may be tied together by suitable members, as indicated by reference characters 23 and 24, and also by the heavier beams 25, which may be utilized also for the purpose of supporting the track rails 11 and 12. The latter may be made up of wood strips overlaid with suitable metallic rails for resisting the wear of the wheels of the car. The posts 20 to 22 inclusive may also be covered by any suitable roof structure, as indicated at 26, and it is an important feature of this structure that the sides and the bottom adjacent the track as well as the roof be thoroughly covered not only with suitable wooden or metallic sheeting as indicated at 27, but with light insulating material of some sort in case the sheeting 27 be not sufficient to exclude most of the light, as it is preferred that the car upon passing into the covered portions of the track as both ends of the platform shall enter into a canyon-like structure as dark as possible. Adjacent the track rails 11 and 12 there will preferably be throughout the structure suitable elevated platform spaces as indicated at 28 and 29 along the sides of the track rails throughout the covered portions, as indicated in both Figs. 2 and 3. It will be seen that the covered track supporting structure as indicated by the sectional view in Fig. 3 is substantially like that shown in Fig. 2 with the exception that this view being taken nearer the end of the platform, which the car leaves upon starting will have one portion of the track shown in section much lower than the corresponding section of track, as shown in Fig. 2, it being the purpose in constructing the track to cause the grades to incline gradually with the inner section of the track as shown in Fig. 3 elevated to permit the outer section of track to pass thereunder at a point indicated generally by the reference characters 35 in Fig. 1. The posts therefore, of the sections shown in Fig. 3 will vary somewhat in their relative height from the corresponding posts shown in Fig. 2, and this will be true to an extent of the posts in each of the struts throughout the structre. The posts corresponding to posts 20, 21 and 22 are indicated in Fig. 3 by reference characters 40, 41 and 42 respectively. In this view the different sections of the track will be seen to be on different elevations, one section being supported by the cross member 43 and another section by the cross member 44 and the posts 40 and 41 will be tied together by the cross ties 45 and 46 respectively. In this view of the structure it will be seen that the roof will also be divided into two sections as indicated by reference characters 47 and 48 respectively, while the track rails will be designated by the same reference characters as heretofore and likewise the platform spaces at each side of the rails to enable the cars to be easily loaded and unloaded in case of accident or unexpected stoppage of the car at any point in the covered track.

I claim:

1. In a pleasure railway the combination with a track structure having a covering therefor adapted to exclude light over a major portion of the track structure, a loading and unloading platform adapted to support a part of a track structure communicating at both ends with the aforesaid track structure so that a car passing over the entire track structure will be within a closure where light is at least partially excluded except for the time that it is passing over the track on the loading and unloading platform, a car adapted to be operated on said track, and means for controlling said car whereby when loaded with passengers it may be operated over the covered portions of said track structure and flashed under speed across the loading and unloading platform from one portion of the closed or covered track structure to another closed and darkened portion thereof.

2. In a pleasure railway the combination with a track structure having a covering therefor adapted to exclude light over a major portion of said track, a loading and unloading platform interposed in the track structure in a break in the track covering so that the said platform will be in full view of spectators, a car adapted to be operated on said track, and means for controlling said car whereby it may be operated over the covered portions of said structure and flashed under speed across the loading and unloading platform from one portion of the closed or covered track structure to another closed and darkened portion thereof.

3. In a pleasure railway the combination with a track structure in the general form of a figure 8, there being a covering over the entire curved portions of the track comprising also a second loop or sinus concentric with one sinus of the figure 8 on the interior thereof for part of its length and passing thence to the opposite sinus and encircling the latter to a point directly opposite the beginning of the first said sinus of the figure 8, there being an uncovered platform connecting the said covered portions of the sinus track structure, a car adapted to be operated over the track, and means for controlling said car whereby it may be stopped and started from said platform in full view of spectators on the exterior of the pleasure railway and may also be flashed across the said platform from one covered portion of the said track to another covered portion thereof in full view of spectators adjacent the uncovered platform.

In testimony whereof I have signed my name to this specification, in the presence of two subscribing witnesses, on this 15th day of September, A. D. 1920.

GEORGE A. SCHMIDT.

Witnesses:
FRANK E. GATES,
A. R. HICK.